United States Patent [19]

Genin

[11] Patent Number: 4,885,768

[45] Date of Patent: Dec. 5, 1989

[54] ACTIVE DIPOLE TELEPHONE LINE PROTECTION DEVICE

[76] Inventor: Jacques Genin, 12 rue Raffet, 75016 Paris, France

[21] Appl. No.: 250,907

[22] Filed: Sep. 29, 1988

[30] Foreign Application Priority Data

Oct. 1, 1987 [FR] France ................. 87 13579

[51] Int. Cl.⁴ ............................................. H04M 1/66
[52] U.S. Cl. ..................................... 379/200; 379/188
[58] Field of Search ............... 379/199, 200, 189, 188, 379/387

[56] References Cited

FOREIGN PATENT DOCUMENTS 0006265 1/1980 European Pat. Off. .
0126496 11/1984 European Pat. Off. .
3617973 7/1987 Fed. Rep. of Germany .

Primary Examiner—James L. Dwyer
Attorney, Agent, or Firm—Michael N. Meller

[57] ABSTRACT

According to the invention, between the two wires (A and B) of the line, an active dipole (DA) is inserted capable of having a low or high impedance. This dipole includes an operational amplifier (AMP) whose output (2) makes it possible to analyze dialling attempts.

5 Claims, 3 Drawing Sheets

ACTIVE DIPOLE TELEPHONE LINE PROTECTION DEVICE

FIELD OF THE INVENTION

The present invention relates to an active dipole telephone line protection device.

BACKGROUND OF THE INVENTION

The current telephone network is conceived so that the operations the subscriber needs to carry out when making a telephone call are reduced to a minimum. The subscriber merely has to unhook his receiver in order to obtain a signal tone and then dial the desired number.

However, there is one drawback to this simple set of operations: it is relatively simple for an unauthorized user to connect a telephone set to the telephone line at a point located between the subscriber telephone set and the corresponding telephone exchange. The unauthorized user may then telephone as he pleases by means of this telephone set, the cost of calls being charged to the subscriber of the telephone set.

Devices have already been embodied making it possible to overcome this drawback. Those devices which come closest to the present invention are those which consist of a circuit inserted between the two wires of the line, this circuit being able to assume two states, namely one with high impedance authorizing normal functioning of the line and the other with low impedance prohibiting functioning of the line.

The device described in the patent no. EP-0 126 496 is a device of the above-mentioned type. It includes a NOT-circuit consisting of a first arm constituted by a Zener diode and a resistor, and a second arm constituted by a switch and a low power resistor. When the subscriber unhooks the receiver, means, which continuously detect the condition of the line, shut off the switch, which branches or shunts the line current through the second arm. Dialling, supposedly completed by a telephone set with a dial modulating the all or nothing current, is then rendered ineffective, the exchange not detecting any breaking-off of the current.

The device described in this document also includes means to recognize a code transmitted from the telephone set and, in the event of jamming with a confidential code previously recorded, to put out of service the NOT-arm and thus authorize subsequent dialling.

If this device is satisfactory in certain respects, it nevertheless has the drawback of being limited to dial telephone sets where dialling is effected by pulses. Thus, it currently more frequently does not function on key-operated telephones with audiofrequency dialling.

SUMMARY OF THE INVENTION

The object of the invention is to overcome this drawback by proposing a device which functions with any type of telephone set, whether it be a dial telephone or key-operated telephone. This objective is attained by means of using, as is the case with the NOT-circuit, an active dipole with an operational amplifier capable of having an almost nil impedance for any alternative signal. This active dipole makes it possible to also analyze dialling attempts.

The present invention specifically relates to a telephone line protection device the kind of which comprise:

a NOT-circuit suitable for being inserted between the two wires of the line, this circuit being able to assume two conditions, namely one with high impedance authorizing normal functioning of the line and one with low impedance prohibiting functioning of this line, a management module disposed between the line wires, this module fulfilling the feed, line condition detection and circuit control functions as regards one of its two conditions, namely those with low or high impedance;

the device of the invention being characterized by the fact that the NOT-circuit inserted between the two line wires is an active dipole comprising an operational amplifier, this dipole providing for the high and low impedances irrespective of the nature of the dialling signal, the output of the amplifier having a voltage making it possible to analyze attempts at dialling, this output being connected through a capacitor to the management module.

BRIEF DESCRIPTION OF THE DRAWINGS

The invention shall be more readily understood by reading the following description of the preferred embodiments, given by way of explanation and in no way restrictive. This description refers to the annexed drawings in which.

DETAILED DESCRIPTION OF THE PREFERRED EMBODIMENTS

Figure 1:
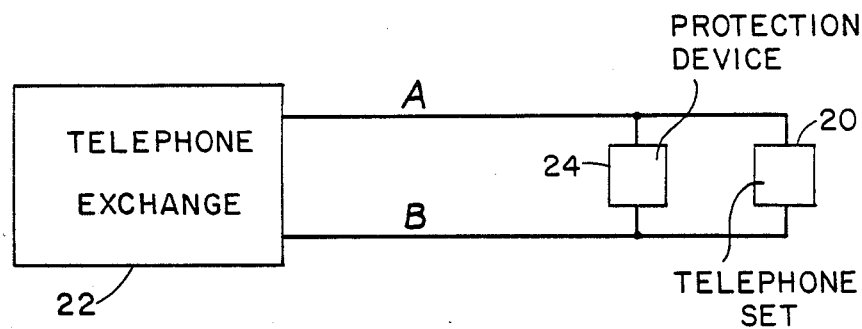
FIG. 1 is a general diagram showing the place occupied by a telephone line protection device.

FIG. 1 shows a telephone line made up of two wires A and B, a telephone set 20 and a telephone exchange 22. The protection device 24 is placed between the two line wires at any place of the line between the station and the exchange.

Figure 2:
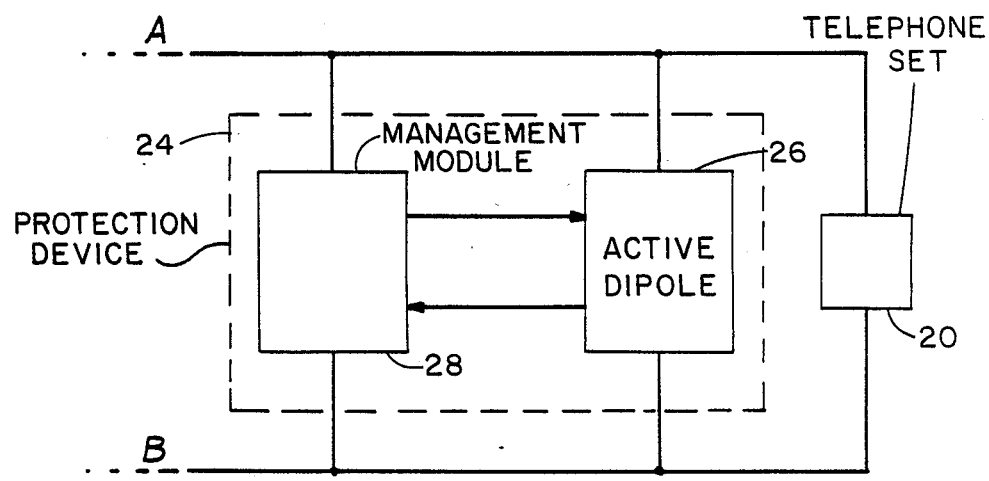
FIG. 2 shows the general disposition of the device of the invention.

The protection device consists of two subassemblies, as illustrated on FIG. 2: an active dipole 26 and a management module 28. The execution variants of the dipole are represented on FIGS. 3 and 4, whilst the management module is described by FIGS. 4 and 5.

Figure 3:
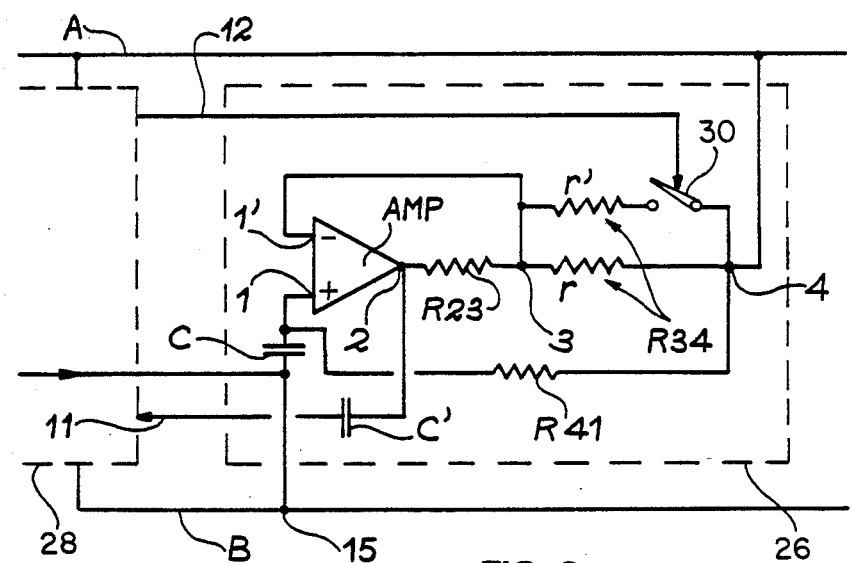
FIG. 3 illustrates a first embodiment of the dipole of the invention.

As shown on FIG. 3, the active dipole of the invention includes an operational amplifier AMP with a positive input 1 and a negative input 1' and with an output 2; the input 1 is connected to the line wire B by a capacitor C and the input 1' is connected to a point 3, itself connected to the output 2 by a resistor R23. The point 3 is connected to a point 4 connected to the line wire A. Between the points 3 and 4 is a variable resistor R34 formed, in the example shown, by a high value resistor r and a low value resistor r' in series with a switch 30. Moreover, the output 2 of the operational amplifier is connected through a capacitor C' by a connection 11 to the management module 28, the latter controlling the switch 30 by a connection 12. As an option, the circuit may include a resistor R41 between the points 4 and 1.

The functioning of this circuit is as follows. Between the conductors A and B, the dipole has the impedance:

$$Z = \frac{R34}{(R32 + R41)} \cdot \left(\frac{1}{C \cdot p} + R41\right)$$

If the time constant R41.C is quite long (30 ms), this impedance may be regarded as being purely resistive to any significant impedance, both for dialling (by any process whatsoever) and for dialogue signals. Then one has:

$$Z = \frac{R34 \cdot R41}{(R34 + R41)}$$

Z is thus comprised of the resistors R34 and R41 between the wires A and B.

R41 placed in parallel may be given a sufficiently large value so as not to disturb normal functioning of the telephone line and to ensure that the aforesaid condition concerning the time constant is always verified (R41>5000 Ohms, C>6 microfads). By giving R34 a value of the same order of magnitude (indeed infinite) by the opening of the switch 30 (controlled by the module 28), the line is available. By giving R34 a sufficiently low value (<50 Ohms) by closing the switch 30, the line is blocked. It should be mentioned that, in the short term, this blocked condition does not modify the potential difference between the wires A and B.

The resistor R23 makes it possible to record at the point 2 an electric voltage representative of the current delivered on the telephone line by the dipole:

$$V3 - V2 = k\frac{R23}{R34} I$$

where k has the dimension of a resistor.

This indication is only significant when the dipole is placed in the situation of blocking the transmission of dialling to the telephone exchange and this then constitutes the sole possibility of analyzing dialling attempts. To attain this purpose, this voltage V2 is sent back to the module 28.

In one variant of this circuit, it would be possible to control the resistor R41 instead of the resistor R34, which would enable a low cutoff frequency to be imposed which would block the line, or impose a high cutoff frequency which would free it completely.

Figure 4:
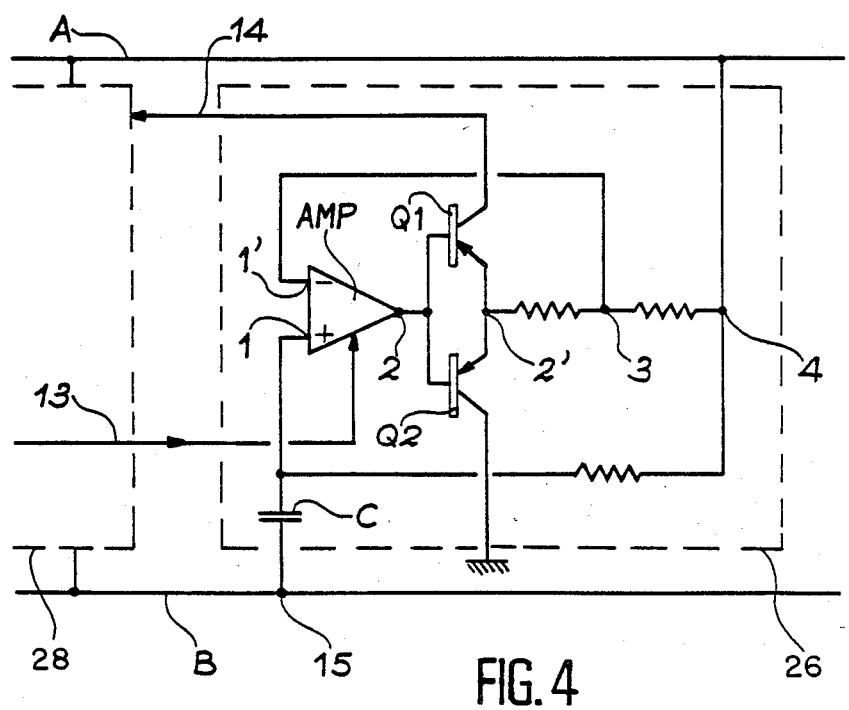
FIG. 4 illustrates a second embodiment of the dipole of the invention.

The dipole 26 of FIG. 4 differs from that of FIG. 3 by the fact that the operational amplifier AMP has its polarization controlled by the management module 28 by means of the connection 13. Placed in the inactive state (nil output current), the amplifier has a high impedance output. Placed in its normal active state, the output has a low impedance.

Moreover, FIG. 4 shows an amplifier circuit formed by the transistors Q1 and Q2. This circuit makes it possible to send to the management module 28, by means of the connection 14, a current more intense than the current available on the output 2 of the operational amplifier AMP.

The bridge of the transistors Q1, Q2 is not specific from the diagram of FIG. 4. Functioning as a current amplifier, it may be as complete as necessary on diagram 3. It may be included in the "operational amplifier".

Figure 5:
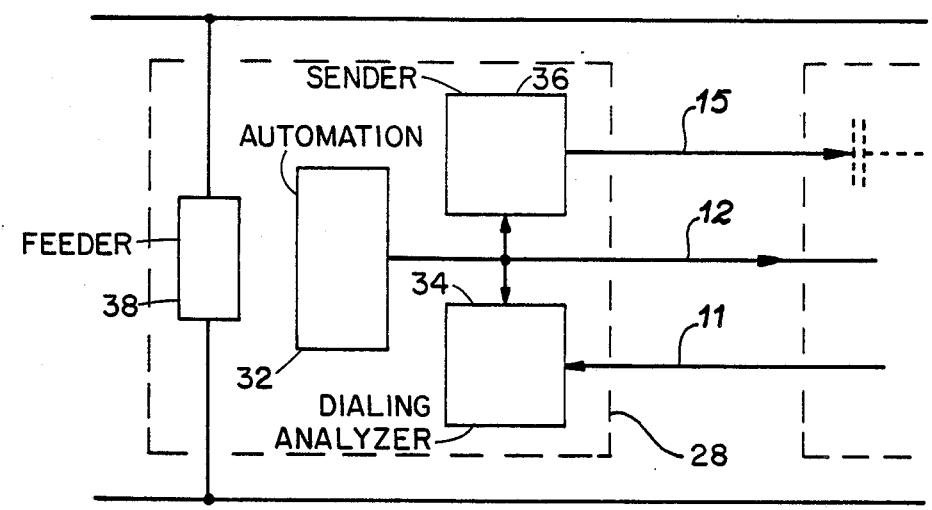
FIG. 5 shows the general disposition of the management module.

FIG. 5 shows the general disposition of the management module. This module includes a microprogrammed automaton 32, a device 34 to analyze dialling attempts and a sending device 36 allowing for sending back signal onto the telephone line (tones, spoken messages recorded or produced by word synthesis, etc). These signals are designed for the user so as to guide him when implementing the sending device. The signals produced by the device 36 shall be transmitted to the point 1 of the dipole 26 by the connection 15 and by means of the capacitor C. The operational amplifier AMP of the dipole then functions as a voltage follower with, as an output impedance, the value of R34, regarded as low in this situation.

The module includes a further circuit 38 for feeding the various devices.

Figure 6:
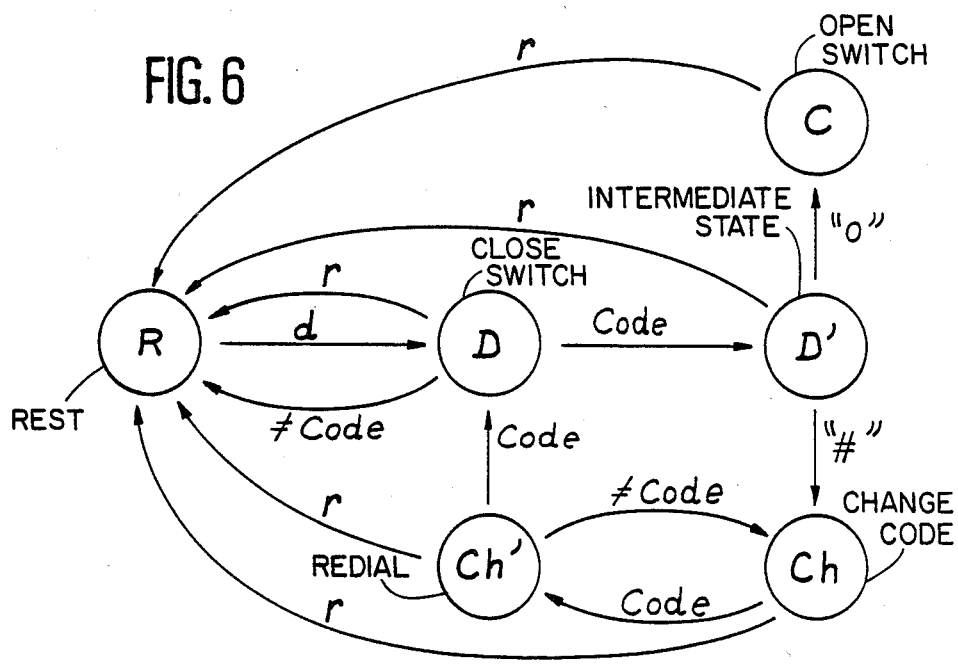
FIG. 6 shows the functioning of the management module.

The module is programmed to embody a finished automaton whose different states are diagrammatically represented in FIG. 6 where the significance of the literal marks is the following:
the arrows indicate changes of condition in the following cases:
d: unhooking of the line,
r: hanging up,
code: confidential code,
≠code: wrong code.

The condition R is the rest condition of the device: the line is hung up (potential difference greater than 30 volts between A and B).

Upon detecting the "unhooked" condition of the line (potential difference less than 20 volts), the device passes into the condition D and the switch 30 of the dipole 26 is closed, which thus blocks the telephone line; the module starts to analyze the dialling attempts. Provision may be made that wrong codes prohibit functioning of the device for a certain time so as to increase the level of security. Only receiving the correct confidential code makes the device pass into the intermediate condition D'.

A special single code (for example "Q") allows for passage into the condition C where the module 28 controls opening of the switch I, thus freeing the telephone line for its normal use.

A further single code (for example "#") allows for passage into the condition Ch used in order to change the confidential code.

Any dialling attempt responding to the correct syntax makes the module pass into the condition Ch'. A new dialling of the same code is demanded by way of verification and makes the module return to the condition D. If verification is abortive, the module returns to the condition Ch.

In each of the conditions or states of this automaton, the device transmits a tone or vocal message so as to guide the user as regards his maneuvers.

The hanging up of the telephone line in any state places the device back in its initial state R.

The uncertainty concerning the polarization direction of the line may result in the dipole 26 being completed by another, equally functional, but with opposite polarity.

What is claimed is:
1. A telephone protection device in a two wire subscriber line comprising:
a NOT-circuit inserted between said two subscriber wires, said circuit assuming two states, namely one with high impedance allowing for normal functioning of the line and the other state with low impedance prohibiting the functioning of said line, a management module disposed between the two wires, said module controlling feeding, line state detection and circuit control functions in said low and high impedance states;

wherein said NOT-circuit comprises an active dipole further comprising an operational amplifier, said dipole providing for said low and high impedances; and wherein irrespective of the type of dialling signal signal on said line and said low and high impedance states, said amplifier is responsive to dialling attempt signals to provide at an output, signals which are able to be analyzed, said output being connected to the management module.

2. A device as recited in claim 1, wherein said operational amplifier has a positive input connected to a first one of said wires via a capacitor, a negative input, said output also being connected to one side of a first resistor, the other side of said first resistor being connected to the negative input and to a second of said wires via a variable resistor.

3. A device as recited in claim 2, wherein the variable resistor includes a switch in parallel with a second resistor, providing, according to the state of the switch, said low or high impedance, said switch being controlled by the management module.

4. A device as recited in claim 2, wherein said operational amplifier includes a third resistor connected between said second wire and said positive input.

5. A device as recited in claim 1, wherein said operational amplifier polarization current is controlled by the management module, the adjustment of said current placing said amplifier in an inactive state corresponding to a high impedance output or in an active state corresponding to a low impedance output.

* * * * *